(12) United States Patent
Fujibayashi et al.

(10) Patent No.: US 7,301,297 B2
(45) Date of Patent: Nov. 27, 2007

(54) SYNCHRONOUS CONTROL DEVICE

(75) Inventors: Kentaro Fujibayashi, Musashino (JP); Tetsuo Hishikawa, Yamanashi (JP); Keisuke Tsujikawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 320 days.

(21) Appl. No.: 11/110,899

(22) Filed: Apr. 21, 2005

(65) Prior Publication Data

US 2005/0241843 A1    Nov. 3, 2005

(30) Foreign Application Priority Data

Apr. 28, 2004   (JP) .............................. 2004-134193

(51) Int. Cl.
*G05B 19/00* (2006.01)
(52) U.S. Cl. ...................... 318/575; 318/560; 318/675
(58) Field of Classification Search ................ 318/575, 318/560, 675
See application file for complete search history.

(56) References Cited

U.S. PATENT DOCUMENTS

| | | | |
|---|---|---|---|
| 4,334,266 A | | 6/1982 | Merbach |
| 4,456,863 A | | 6/1984 | Matusek ...................... 364/474 |
| 4,629,956 A | * | 12/1986 | Nozawa et al. ............. 318/625 |
| 4,766,546 A | | 8/1988 | Fujimoto ..................... 318/572 |
| 4,988,937 A | * | 1/1991 | Yoneda et al. .............. 318/675 |
| 5,175,680 A | * | 12/1992 | Yoneda et al. ................ 700/71 |
| 5,181,178 A | * | 1/1993 | Sasaki et al. ................ 700/169 |
| 5,181,441 A | * | 1/1993 | Okada ......................... 82/1.11 |
| 5,212,648 A | * | 5/1993 | Sugita et al. ................ 700/193 |
| 5,260,879 A | * | 11/1993 | Sasaki et al. ................ 700/193 |
| 5,859,515 A | * | 1/1999 | Takizawa et al. ........... 318/560 |
| 6,155,148 A | * | 12/2000 | Shinozaki et al. ........... 82/1.11 |
| 6,404,160 B2 | * | 6/2002 | Sagasaki et al. ............ 318/600 |
| 6,850,806 B2 | * | 2/2005 | Yutkowitz ..................... 700/54 |
| 2006/0186845 A1 | * | 8/2006 | Terada et al. ................ 318/432 |

FOREIGN PATENT DOCUMENTS

| | | |
|---|---|---|
| EP | 0 358 776 | 2/1989 |
| JP | 6-304814 | 11/1994 |
| JP | 8-263113 | 10/1996 |

OTHER PUBLICATIONS

Japanese Notice of Reasons for Rejection issued on Nov. 7, 2006 in corresponding patent application No. 2004-134193.
European Search Report dated Sep. 16, 2005, for related European Patent Application No. EP 05 25 2580 cites EP 0358776 (Reference: AG).
European Search Report, dated Sep. 16, 2005, for related European Patent Application No. EP 05 25 2580.

\* cited by examiner

*Primary Examiner*—Rita Leykin
(74) *Attorney, Agent, or Firm*—Staas & Halsey LLP

(57) ABSTRACT

An 'interval' in which the synchronization status between the movable axes subject to synchronous control is monitored, an equation between the movable axes in the 'interval', and an 'allowable displacement' for the positional relationship obtained with this equation and the actual positional relationship are set in advance. The 'start condition' and 'termination condition' for synchronous status verification processing are set with the master position and the like. When the start condition for synchronous status verification processing is satisfied, it is detected whether or not the actual position and the position obtained with the equation are within the range of the allowable displacement based on the position of the movable axes. If not within the range of the allowable displacement, operation set as 'operation to be executed when the allowable displacement is exceeded' is executed.

16 Claims, 9 Drawing Sheets

FIG. 2

SYNCHRONOUS RELATIONSHIP INFORMATION 3

SYNCHRONOUS RELATIONSHIP INFORMATION 2

SYNCHRONOUS RELATIONSHIP INFORMATION 1

SYNCHRONOUS RELATIONSHIP

|  | MASTER AXIS | SLAVE AXIS | EQUATION | ALLOWABLE DISPLACEMENT |
|---|---|---|---|---|
| AXIS | X | Y | — | Y |
| POSITION INFORMATION | ACTUAL POSITION | ACTUAL POSITION |  |  |
| INTERVAL 1 | 10.000 | 20.000 | Y = 3*X − 10.0 | −1.000 ~ 1.000 |
|  | 20.000 | 50.000 |  |  |
|  | DATA_END |  |  |  |
|  |  |  |  |  |
|  |  |  |  |  |

START CONDITIONS

|  | MASTER AXIS | SLAVE AXIS | SIGNAL |
|---|---|---|---|
| AXIS | X>=10.000 && X <= 11.000 | — | — |

TERMINATION CONDITIONS

|  | MASTER AXIS | SLAVE AXIS | SIGNAL |
|---|---|---|---|
| AXIS | X > 20.000 | — | — |

OPERATION WHEN ALLOWABLE DISPLACEMENT EXCEEDED

|  | MATER AXIS | SLAVE AXIS | SIGNAL |
|---|---|---|---|
| AXIS | AXIS STOP | AXIS STOP | OUT1 SIGANL = ON |

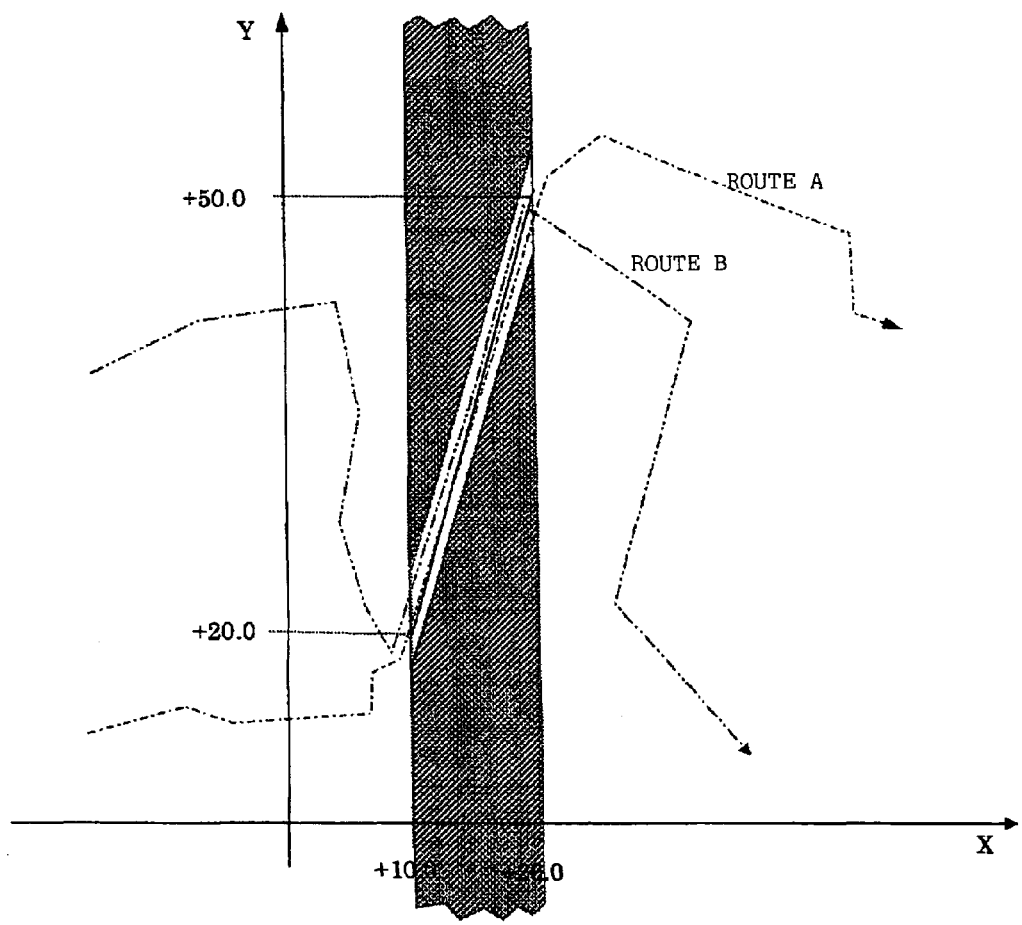

| SYNCHRONOUS RELATIONSHIP | | | | |
|---|---|---|---|---|
| | MASTER AXIS | SLAVE AXIS | EQUATION | ALLOWABLE DISPLACEMENT |
| AXIS | X | X | — | X |
| POSITION INFORMATION | INSTRUCTED POSITION | ACTUAL POSITION | | |
| INTERVAL 1 | 10.000 | 10.000 | Y = X | -1.000~ 1.000 |
| | 20.000 | 20.000 | | |
| INTERVAL 2 | | | Y = X | -0.500~ 0.500 |
| | 30.000 | 30.000 | | |
| | | DATA_END | | |

FIG. 12

| SYNCHRONOUS RELATIONSHIP | | | | |
|---|---|---|---|---|
| | MASTER AXIS | SLAVE AXIS | EQUATION | ALLOWABLE DISPLACEMENT |
| AXIS | (T) | X | – | X |
| POSITION INFORMATION | TIME | ACTUAL POSITION | | |
| INTERVAL 1 | 0.9 SECONDS | 19.000 | X = T*10+10. | -1.000~ 1.000 |
| | 1 SECOND | 20.000 | | |
| | DATA_END | | | |
| | | | | |
| | | | | |

SYNCHRONOUS CONTROL DEVICE

BACKGROUND OF THE INVENTION

1. Field of the Invention

The present invention relates to a synchronous control device verifying the synchronous relationship in machinery such as machine tools and industrial machinery, in devices, and in equipment which have a plurality of movable axes driven by servo-motors, and in which these movable axes are synchronized.

2. Description of the Related Art

In some cases, machine tools and industrial machinery have a plurality of movable axes (axes driving movable parts), and this plurality of movable axes operate in a coordinated manner. For example, when cutting a moving workpiece with a cutter at the prescribed position, it is necessary to maintain the synchronous relationship between the movable axis driving the workpiece and the movable axis driving the cutter from start to completion of cutting, however, this synchronization need not be maintained during other intervals. Thus, it is necessary to check the synchronous relationship during the interval in which it is necessary to maintain the synchronous relationship between the plurality of movable axes.

Conventionally, checks are conducted to determine whether the value of position deviation (or the value of delay with respect to a command for each movable axis) has exceeded the maximum value, in other words, whether each movable axis is operating in accordance with the command, in order to check the synchronous relationship between this plurality of movable axes.

The conventional check of the synchronous relationship by checking position deviation is a check to determine whether or not each movable axis is operating in accordance with the command, and is an individual check. When the command itself contains an error due to a mistake in programming and the like, each movable axis operates according to the command, however there is a problem in that, if the synchronous relationship breaks down, the synchronous relationship can no longer be checked.

Furthermore, since the position deviation indicates the deviation with respect to the command, an alarm is generated and the program is stopped when the normal maximum value is exceeded, generally, and there is a problem in that avoidance operation and the like cannot be executed immediately.

SUMMARY OF THE INVENTION

The present invention is related to a synchronous control device synchronously controlling at least two movable axes, having one movable axis as the reference, and at least one other movable axis as a synchronized axis.

The first aspect of the synchronous control device according to the present invention comprises position detection means to constantly determine the position of each movable axis; storage means to store information on the synchronous relationship between the positions of the movable axes subject to synchronous control, an allowable displacement, and an operation to be executed when the allowable displacement is exceeded; displacement detection means to detect whether or not the relationship between the positions of the respective movable axes determined by the position detection means is within the range of the allowable displacement; and abnormal time operation means to execute the operation to be executed when the allowable displacement is exceeded, when the displacement detection means detects that the relationship between the positions of the respective movable axes exceeds the allowable displacement.

The aforementioned first aspect of the synchronous control device may incorporates the following features.

The storage means store at least one set of information on the synchronous relationship between the positions of the movable axes subject to synchronous control, and the allowable displacement. The synchronous control device further comprises selection means to select one set of information of the sets of information stored in the storage means. The displacement detection means detects whether or not the relationship of the positions of the movable axes is within the range of the allowable displacement in the selected set of information.

The synchronous control and verification of the synchronous relationship are executed in parallel. Verification of the synchronous relationship executed in parallel with the synchronous control is executed by a signal input or program command.

The second aspect of the synchronous control device according to the present invention comprises position detection means to constantly determine the position of each movable axis; storage means to store at least one set of information on the synchronous relationship between the positions of the movable axes subject to synchronous control, allowable displacement, a synchronous relationship verification start condition, a synchronous relationship verification termination condition, and an operation to be executed when the allowable displacement is exceeded; selection means to select at least one set of information from the information stored in the storage means; synchronous relationship verification start determination means to determine whether or not the verification start condition for synchronous relationship of the information selected with the selection means has been satisfied; displacement detection means to detect whether or not the relationship between the positions of the respective movable axes determined by the position detection means is within the range of the allowable displacement after verification of the synchronous relationship has started with the synchronous relationship verification start determination means; abnormal time operation means to execute the operation to be executed when the allowable displacement is exceeded, when the displacement detection means detects that the relationship between the positions of the respective movable axes exceeds the allowable displacement; and synchronous relationship verification termination means to determine whether or not the termination condition for synchronous relationship verification is satisfied after verification of the synchronous relationship has started, and to terminate verification as to whether or not the synchronous relationship is in the normal status when the termination condition is satisfied.

The aforementioned second aspect of the synchronous control device may incorporates the following features.

The synchronous control and verification of the synchronous relationship are executed in parallel. Verification of the synchronous relationship executed in parallel with the synchronous control is executed by a signal input or program command.

The synchronous relationship between the positions of the movable axes subject to synchronous control is composed of an interval and an equation of synchronous relationship between the movable axes in the interval. The number of the intervals set and stored is at least one.

The synchronous relationship verification start condition and the synchronous relationship verification termination condition stored in the storage means specify at least one of conditions including relative or absolute time, instructed position of at least one axis, and signal status.

Speed detection means are provided to detect the speed of each movable axis, and the synchronous relationship verification start condition and the synchronous relationship verification termination condition stored in the storage means specify the speed detected with the speed detection means.

Any of actual movable axis position information, instructed position information, and time information, can be specified for the synchronous relationship between the positions of the movable axes stored in the storage means.

The synchronous relationship of the positions of the movable axes stored in the storage means specifies a track by specifying the position information for each axis in the synchronous relationship with a sequence of points, and specifies an arbitrary expression between each sequence of points. The allowable displacement between each pair of points in the sequence of points is specified as distance information or an equation.

Operation with the abnormal time operation means is conducted by a program command, and a control program set and stored is executed based on this command.

Verification of the synchronous relationship can be halted by a signal or program during the verification of the synchronous relationship.

Since the synchronous control device of the present invention has the aforementioned configuration, the synchronously controlled movable axes can be readily checked to determine whether or not the precision of synchronization is as desired, and furthermore, only the necessary intervals need be checked to determine whether or not the precision of synchronization is as desired.

BRIEF DESCRIPTION OF THE DRAWINGS

The aforementioned, and other, objects and characteristics of the present invention will be clear from the description of the following embodiments referred to in the accompanying figures.

FIG. 2 is a diagram describing the synchronous relationship information stored in the synchronous control device in FIG. 1;

FIG. 4 is a diagram showing the area of the synchronous relationship verification area to which entry is not permitted;

FIG. 5 is an example of an operating program for a master axis controlled by the synchronous control device in FIG. 1;

FIG. 6 is an example of an operating program for a slave axis controlled by the synchronous control device in FIG. 1;

FIG. 9 is a diagram showing an example of the command format of the synchronous relationship verification operation command;

FIG. 10 is an example of a program using the synchronous relationship verification operation command shown in FIG. 9;

FIG. 11 is a diagram showing an example of settings of synchronous relationship information when actual position with respect to instructed position is monitored;

FIG. 12 is an example of settings for synchronous relationship information when ease of follow-up with respect to a command in the prescribed time band is monitored; and FIG. 13 is an example of the command format for an instruction for halting synchronous relationship verification processing.

DETAILED DESCRIPTION OF THE PREFERRED EMBODIMENTS

Figure 1:
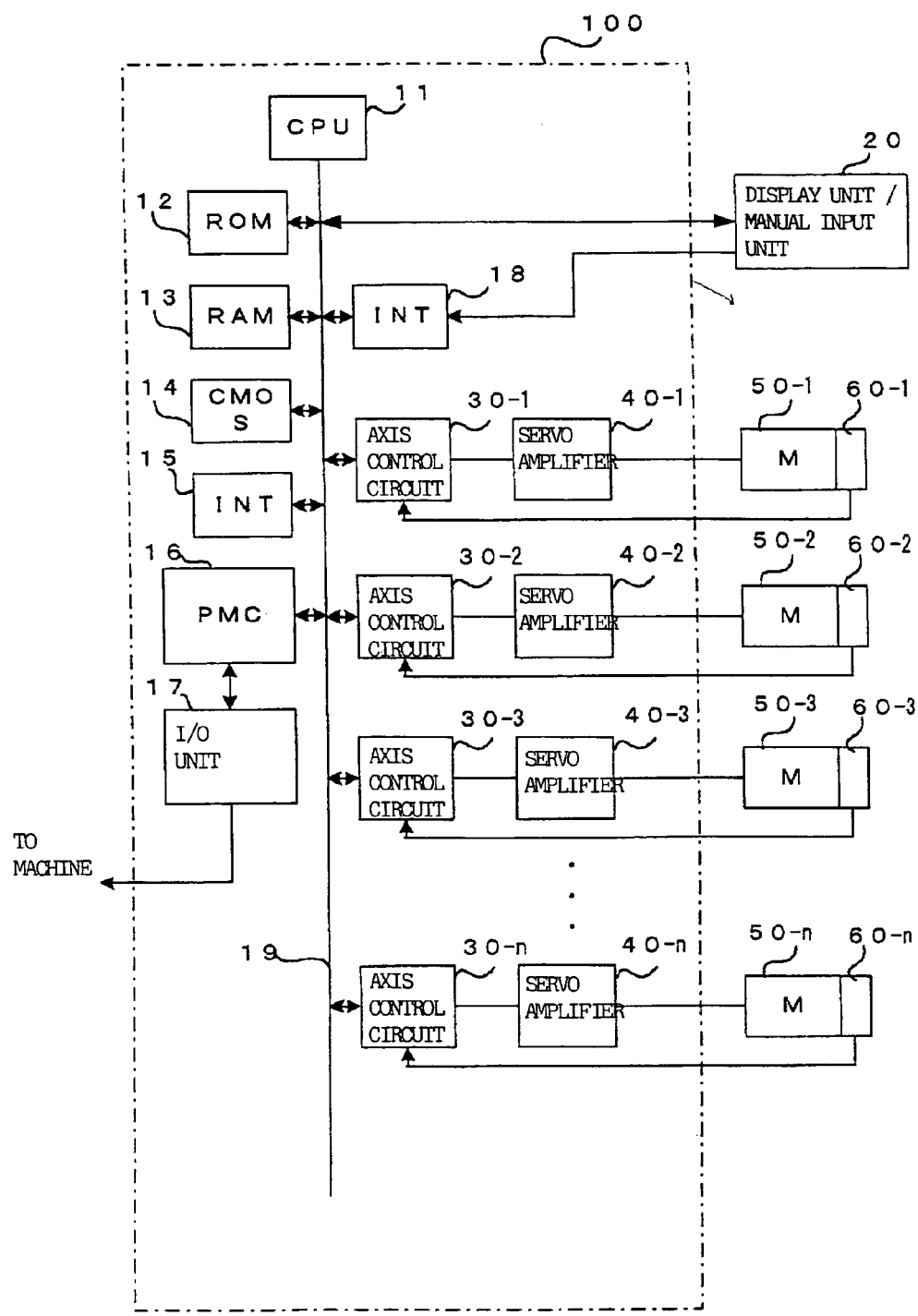
FIG. 1 is a block diagram of the primary parts of the synchronous control device of an embodiment of the present invention.

FIG. 1 is a block diagram of the primary parts of the synchronous control device 100 of an embodiment of the present invention. The CPU 11 is a processor for overall control of the synchronous control device 100. The CPU 11 loads the system program stored in the ROM 12 via the bus 19, and controls the overall synchronous control device in accordance with the system program. The RAM 13 stores temporary computed data and display data, and various types of data inputted by the operator via the display unit/manual input unit 20 comprised of a display unit comprised of a CRT or LCD and the like, and a manual input unit comprised of a keyboard and the like. The CMOS memory 14 is comprised of a non-volatile memory having battery backup (not shown in figures) in which the storage status is maintained even when the synchronous control device 100 power supply is OFF. The operating program loaded via the interface 15, the operating program inputted via the display unit/manual input unit 20, and the synchronous control device information and the like described below, are set and inputted in the CMOS memory 14.

The interface 15 permits connection of the synchronous control device 100 and external devices. The PMC (Programmable Machine Controller) 16 outputs signals to, and controls, the controlled machine and subsidiary devices via the I/O unit 17 with the sequence program incorporated in the synchronous control device 100.

The axis control circuits 30-1 through 30-n for the movable axes of the machine conduct position/speed feedback control with the movable axis movement commands from the CPU 11 and the position and speed feedback signals from the position/speed detector 60-1 through 60-n in the servo-motors 50-1 through 50-n of the movable axes, and output each movable axis command to the servo amplifiers 40-1 through 40-n. The servo amplifiers 40-1 through 40-n receive these commands to drive the servo-motors 50-1 through 50-n of the movable axes of the controlled machine. The configuration of this synchronous control device 100 is similar to the configuration of the well-known conventional numerical control device.

FIG. 2 is a diagram describing the synchronous relationship information stored in the CMOS memory 14 of the synchronous control device. A tabular format is employed in FIG. 2, however, the method of setting can be freely chosen, and may, for example, employ setting with a program. The synchronous relationship information is comprised of the following elements.

(1) Specify the master axis forming the reference (X axis (for example, the axis driven by the first servo-motor 50-1) specified in the example in FIG. 2).

(2) Specify the movable axis requiring verification of the synchronous relationship, from among the slave axes synchronized with the master axis. In the example in FIG. 2, one axis, the Y axis (the movable axis driven by the second servo-motor 50-2), is specified, however, a plurality of axes may be specified.

(3) Specify the interval over which the master axis/slave axis synchronous relationship is verified. A plurality of these intervals can also be specified. In the example in FIG. 2, 10.000 through 20.000 on the X axis and 20.000 through 50.000 on the Y axis are specified as interval 1.

(4) Specify the equation linking the aforementioned synchronous relationship verification intervals. The ideal track of the synchronous relationship is defined by specifying the equation linking each pair of points. The sequence of points (interval) and the equation linking them can be defined, and the ideal track specified, with the aforementioned (3) and (4). In the example shown in FIG. 2, "Y=3×X−10.0" is defined and set as the equation.

(5) Specify the allowable displacement in each synchronous relationship verification interval. Specify the actual Y axis allowable displacement with respect to the position of the slave axis determined with the equation specified in the aforementioned (4) for the position of the master axis. In the example in FIG. 2, the range is specified with a constant, however, it may be specified with an equation.

(6) Specify the type of position information checked in the synchronous relationship verification interval. It is possible to specify whether it is the feedback position (actual position) or the instructed position. In the example in FIG. 2, the actual position (feedback position) are specified for both the X and Y axes.

(7) Specify the synchronous relationship verification processing start condition when the present synchronous relationship information is called. When the command is inputted, 'immediate start', 'start when the master axis reaches a predetermined interval', 'start when the slave axis reaches a predetermined interval', and 'start when the specified signal is specified' and the like can be selected. In the example in FIG. 2, starting of the check when the master axis position is in the interval 10.000 through 11.000 is specified.

(8) Specify termination of synchronous relationship verification processing while verifying the synchronous relationship using the present synchronous relationship information. 'Terminate when the master axis reaches a predetermined interval', 'terminate when the slave axis reaches a predetermined interval', and 'terminate when the specified signal is specified' and the like can be selected. In the example in FIG. 2, termination of synchronous relationship verification processing when the master axis position is equal to or greater than 20.000 is specified.

(9) Specify operation to be executed the allowable displacement during the present synchronous relationship check is exceeded. It is possible to call one or more of the operations, 'specified signal ON', 'specified signal OFF', 'halt program', 'decelerate master axis', 'execute specified program', 'stop axis', and the like. For example, if 'stop program' and 'execute specified program' are specified and a retreat program is registered in the specified program, it is possible to halt the current operating program and to execute the retreat program, when a check error is detected. In the example in FIG. 2, by stopping the master axis and slave axis and setting the OUT1 signal set to '1', an alarm status is specified for notification by a signal.

Based on setting and storage of the aforementioned synchronous relationship information, for the interval which is specified with the synchronous relationship and also is specified with the start condition and termination condition for synchronous relationship verification processing, the relationship (positional relationship) of the synchronously controlled movable axes, obtained with the equation set for the above interval, is determined whether it is within, or out of, the set allowable displacement.

As noted above, a plurality of synchronous relationship information is set for each operation, and stored with a synchronous relationship information number and the like attached.

Figure 3:
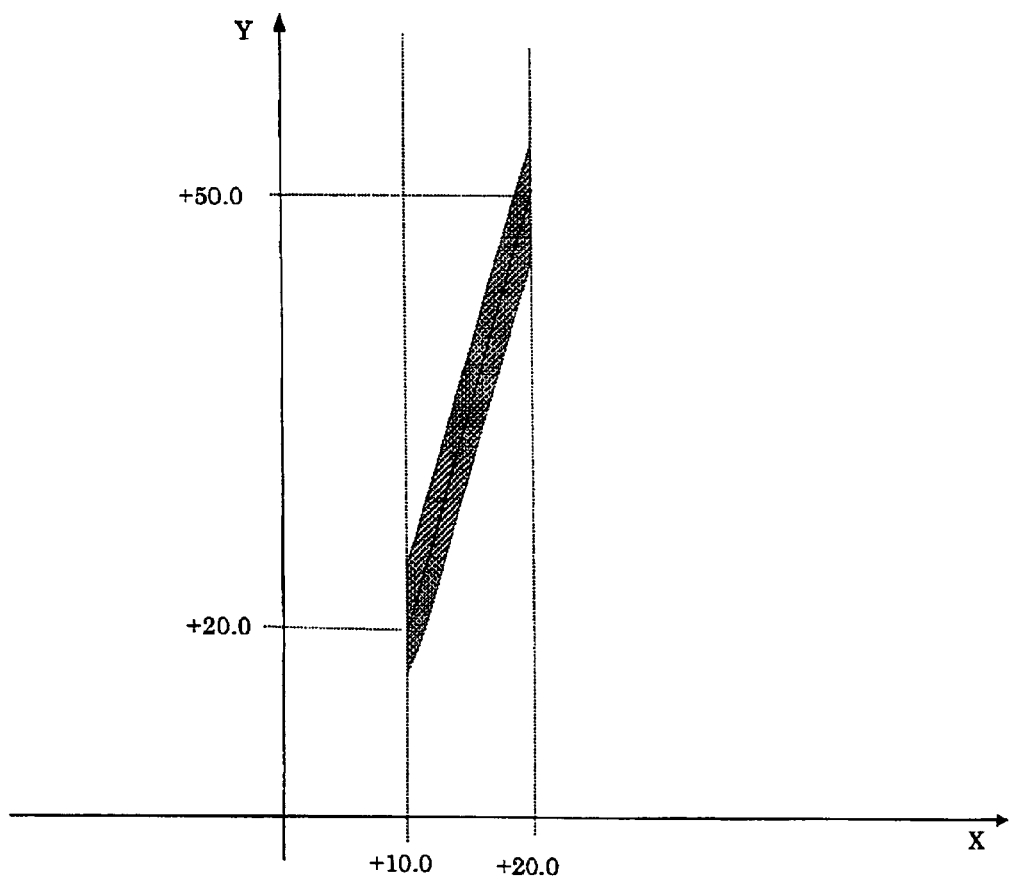
FIG. 3 is a diagram showing the synchronous relationship verification area when the synchronous relationship information shown in FIG. 2 is set.

FIG. 3 shows the checked interval when the synchronous relationship information in the example in FIG. 2 is set in diagrammatic form. The hatched part in the interval shows that the allowable operating range is (X, Y)=(+10.000, +20.000) through (+20.000, +50.000).

FIG. 4 is the reverse of the case in FIG. 3. The hatched part of the figure shows the area in which entry is not permitted. It is assumed that a dangerous situation in which damage and the like may occur when the hatched part is entered. Thus, since movement by any route outside the hatched part presents no problem, movement may be along route A or route B in FIG. 4, for example.

FIG. 5 is an example of operating program for a master axis. FIG. 6 is an example of operating program for a slave axis. M55 in the N2 block in FIG. 5 is an auxiliary function instruction. When this auxiliary function instruction is read out, the CPU 11 outputs this auxiliary function instruction to PMC16. Furthermore, G146 in the N11 block in the program in FIG. 6 is a synchronous start command. The master axis position is specified by R, the amount of movement is specified by Q, and the N11 block command implies 'start synchronization when master axis (X axis) position reaches 10.0, and then synchronize slave axis (Y axis) until master axis moves a distance of +10.0, and assuming slave axis movement when the master axis has moved +10.0 is +30.0, the slave axis movement over this interval is determined by the proportional distribution (10:30) with respect to the amount of master axis movement'.

The CPU 11 of the synchronous control device 100 of the present embodiment can execute a plurality of programs simultaneously and in parallel, and executes the two programs in FIG. 5 and FIG. 6 in parallel. For example, the CPU 11 executes the program in FIG. 6 to move the Y axis to the position 20.000 in the N10 block, and waits in the N11 block until the position of the X axis (the master axis) reaches 10.000. When executing the program in FIG. 5 at this point, the X axis moves to the position 0.000 in the N1 block. The auxiliary function is executed in the N2 block, so that the M55 command is outputted to PMC16. Then, the synchronous relationship information number used in the ladder program (control signal) in PMC16 is selected and execution of a synchronous relationship check is instructed. When the N3 block is executed, the X axis is moved from the position 0.000 to the position 100.000 at a speed of 1000. The program in FIG. 6 being stopped at N11 starts synchronization at the time when the X axis reaches 10.000, continuing this synchronization until the X axis reaches 20.000. Synchronization of the Y axis terminates when the X axis reaches 20.000, and the N12 and subsequent blocks are executed asynchronously with the X axis. After the synchronization is released, the X axis continues to move to the position 100.000 at a constant speed. After that, the N4 block is executed.

Figure 7:
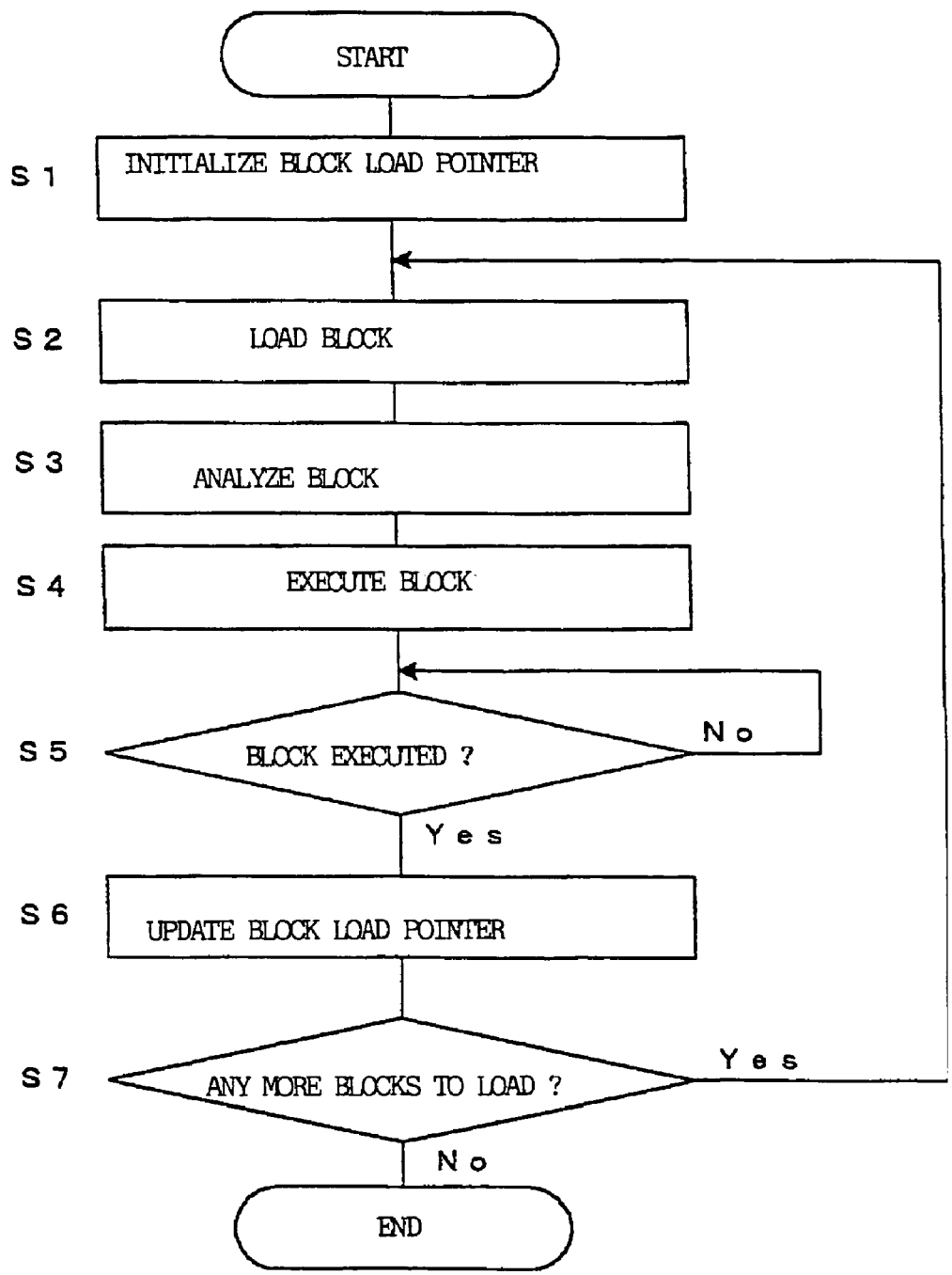
FIG. 7 is a flowchart showing an example of processing flow for executing the operating program stored in the synchronous control device in FIG. 1.

FIG. 7 is a flowchart showing an example of processing flow for executing the operating program. When the CPU 11 accepts program start, it initializes the load pointer to so that the load pointer points to the block to be executed first in the program to be executed first (step S1). The information in the block pointed to by the load pointer is loaded (step S2), the program is analyzed (step S3), and the block is executed (step S4). The executed block is monitored to determine whether or not it has been terminated (step S5), and when terminated, the load pointer is updated to point to the next block (step S6). A check is conducted (step S7) to determine whether or not any blocks remain to be loaded (that is, program end has not been reached), and if block(s) remain to be loaded, processing returns to step S2 (step S2) and the operation in step S2 through step S7 is repeated. This processing is executed a plurality of times in parallel. For example, a plurality of programs shown in FIG. 5 and FIG. 6 are executed in parallel.

Figure 8:
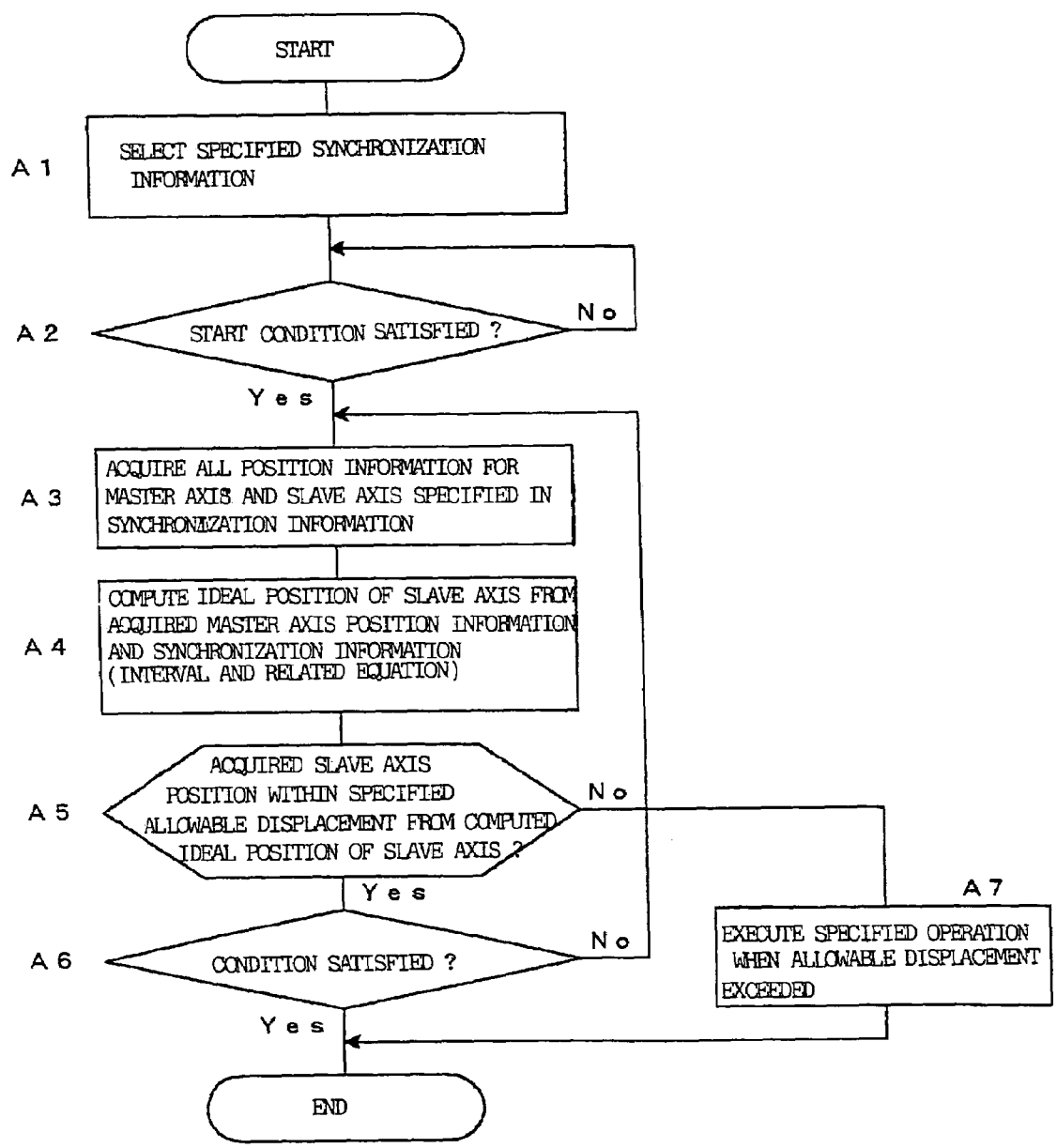
FIG. 8 is a synchronous relationship verification processing flowchart according to the synchronous control device in FIG. 1.

FIG. 8 is a synchronous relationship verification processing flowchart. In the aforementioned operation processing, the auxiliary function is executed by execution of block N2 in FIG. 5, and the aforementioned processing shown in FIG. 8 is executed with instruction for execution of synchronous relationship verification processing through a ladder program.

Firstly, when synchronous relationship verification processing start is accepted, the specified synchronous relationship information is selected within a plurality of synchronous relationship information which have already been registered as shown in FIG. 2 (step A1). Next, a check is conducted to determine whether or not the start condition specified in the synchronous relationship information is satisfied (step A2). If the start condition is not satisfied, processing waits until the conditions are satisfied. If the start condition is satisfied, on the other hand, the synchronous relationship check is started. Information on each position of the master axis and slave axis specified in the synchronization information is acquired (step A3).

The interval to which the master axis position belongs, acquired from the interval information registered in the synchronous relationship information, is selected, and the ideal position of the slave axis is computed from the position information of the master axis and the equation registered in the synchronous relationship information in the selected interval (step A4). The deviation of the position of the slave axis acquired in step A3 with respect to the computed position of the slave axis is obtained, and check is conducted to determine whether or not this deviation is within the allowable displacement registered in the synchronous relationship information in that interval (step A5). If the deviation is within the allowable displacement, a check is conducted to determine whether or not the termination condition for synchronous relationship verification processing is satisfied (step A6). If the termination condition for synchronous relationship verification processing is not satisfied, processing returns to step A3 and the operation in step A3 through step A6 is repeated.

When the synchronous relationship check termination condition is satisfied, synchronous relationship verification processing is terminated. Furthermore, when the allowable displacement is exceeded in step A5, operation in accordance with the registered operation to be executed when the allowable displacement is exceeded is executed (step A7), and synchronous relationship verification processing is terminated.

Synchronous relationship verification processing operation shown in the aforementioned flowchart is described below using the example in FIG. 2. It is assumed that the synchronous relationship information 1 is specified as the synchronous relationship information.

The synchronous relationship information 1 is selected (step A1), waiting start of the synchronous relationship check waits until the actual position of the X axis (or the master axis) (X axis position fed-back from the position/speed detector 60-1) comes in the range 10.000 through 11.000 (step A2). The synchronous relationship check is started when the X axis (the master axis) enters the range 10.000 through 11.000 specified as the start condition. The actual position information (fed-back position information) for the movable axes, the master axis (X axis) and slave axis (Y axis), specified as the synchronization information, is acquired (step A3). When the position on the master axis (X axis) is in the interval 10.000 through 20.000, the ideal position y on the Y axis is represented by "y=3×x−10.0" when the actual position on the X axis is x (step A4). A check is conducted to determine whether or not the difference between the actual position on the Y axis (the slave axis) and the ideal position y on the slave axis computed from the position on the master axis is within the set range of −1.000 through 1.000 (step A5). If it is within the range of −1.000 through 1.000, a check is conducted to determine whether or not the position on the X axis (the master axis) is equal to or greater than 20.000, in accordance with the termination condition (step A6). Synchronous relationship verification processing is repeated if the termination condition is not satisfied. Thus, it is possible to conduct a check to determine whether or not an abnormality has occurred in the synchronous relationship in the hatched part in FIG. 3 and an incorrect route has been used. Furthermore, during synchronous relationship verification processing, when the difference between the actual position and the ideal position y on the Y axis (the slave axis) is verified as not being within −1.000 through 1.000, the master axis and slave axis are stopped, and the OUT1 signal is set to ON to inform the fact that an abnormality has been detected.

In the aforementioned embodiment, 'signal to determine which synchronous relationship information is selected' and 'signal instructing execution of synchronous relationship verification' are outputted using a ladder program, and synchronous relationship verification operation is started, however, it may also be instructed by writing this synchronous relationship verification operation command as one block of a program command. The following example is described as the second embodiment.

FIG. 9 is an example of the command format. 'G65 H500' is a command to start the synchronous relationship verification processing immediately after starting execution of the immediately previous block. When there is no previous block, it is executed immediately. 'P1' declares the use of synchronous relationship information 1 as the synchronous relationship information.

In program execution processing, if program analysis recognizes a synchronous relationship verification processing execution block, synchronous relationship verification processing as shown in FIG. 8 is started. If a format such as shown in this example is prepared, the synchronous relationship verification processing executed in the N2 block via the ladder program in the program in FIG. 5 may be described solely with the program commands as shown in FIG. 10. Thus, since the start can be made without execution via a ladder program, it is possible to start the synchronous relationship verification processing, upon start of the block to be checked, without taking any timing by using a ladder program or the like, by giving an instruction immediately after the block in which the synchronous relationship is to be verified.

For example, by executing N100 in FIG. 10, the aforementioned synchronous relationship verification processing is started, and the axis movement command and synchronous relationship verification processing operate in parallel.

Furthermore, if only the start block of the synchronous relationship verification processing as shown in FIG. 9 is described in the program, the synchronous relationship verification processing can be executed as a separate program. In a system in which a plurality of programs can be executed in parallel, operating programs having movement commands for movable axes and other commands, and synchronous relationship verification processing can be executed in parallel in separate programs.

In the example shown in FIG. 2 above, the verification start/terminate conditions recorded in the synchronous relationship information are determined by the positions and the like of the master axis and slave axis. However, it is possible to specify the verification start/terminate conditions by time, instead of position. For example, it is possible to specify the start by using an instruction such as 'start immediately after startup' or 'execute after 10 seconds'. Thus, it is possible to use a method in which synchronous relationship verification is not conducted when a small instability occurs for a fixed period following synchronization start. In this case, in the synchronous relationship verification processing shown in FIG. 8, the timer is started immediately after the start of processing, and it is determined whether or not the set start condition time is reached in step A2 in FIG. 8. Furthermore, it is determined whether or not the set termination condition time is reached in step A6 in FIG. 8.

Furthermore, it is possible to specify the verification start/terminate conditions by a signal status, thereby adapting to a case where the start/termination of synchronous relationship verification must be performed on the basis of information not controlled by the synchronous control device itself. In this case, in the processing in FIG. 8, the processing in step A2 and A6 is replaced with determination as to whether or not a signal to be specified has been specified. Furthermore, it is possible to specify the verification start/terminate conditions by the speed of a specified movable axis, thereby allowing control to be performed such that synchronous relationship verification operation is started when a certain speed is reached, and synchronous relationship verification is made unnecessary when speed drops below a certain speed. In this case, the processing in step A2 and A6 in FIG. 8 is replaced with determination as to whether or not the speed of the specified movable axis (instructed speed or fed-back speed) has reached the specified speed.

FIG. 11 is an example of a combination of actual position and instructed position as synchronous relationship information when the actual position is monitored with respect to the instructed position. Synchronous relationship information such as 'Start condition', 'termination condition', and 'operation to be executed the allowable displacement is exceeded' are omitted.

Since the actual position generally has a tendency to be delayed with respect to the position command in operation, the instructed position and actual position differ during axis operation. A numerical control device outputs this difference between the instructed position and actual position as position deviation, and when this position deviation exceeds the allowable value, the device is determined as not operating in accordance with the command, and an alarm and the like is outputted. However, this allowable value is generally set for a maximum speed, not for each interval finely. Since it is possible to record the instructed position and actual position of the same axis (X axis) and set a different allowable displacement for each interval as shown in FIG. 11, this implies that an allowable error (delay) with respect to the instructed position can be set for each interval. Thus, for example, it is possible to make fine specifications, such as reducing the allowable error in intervals in which speed can be reduced, while increasing the allowable error in intervals in which speed can be increased, or, for the same speed, increasing the allowable error in intervals in which resistance is high, while reducing the allowable error in intervals in which resistance is low, thereby improving the accuracy with which it is possible to verify whether or not operation was in accordance with the command.

Furthermore, FIG. 12 is an example of settings for synchronous relationship information when ease of follow-up with respect to a command in the prescribed time band is monitored. In this example, time is specified for the master axis, and the actual position is specified for the X axis as the slave axis to be monitored. In this example, a check is conducted between 0.9 seconds and 1 second after synchronous relationship verification processing has started to determine whether or not the X axis is in the desired position. In other words, since the set equation is $X=T\times10+10$, the X axis moves between the two points $X=19.000$ at $T=0.9$ and $X=20.000$ at $T=1$, and the position of the X axis determined with the equation and the actual position are compared to determine whether or not they are within the set allowable displacement $-1.000$ through $1.000$.

Setting of the synchronous relationship information in this manner is used in applications in which, for example, axis operation commands started simultaneously from two control devices incapable of sharing a common position information is normally executed without any kind of synchronous relationship, however, since there is a possibility of interference within a certain time band, this is detected and avoided.

Furthermore, in the aforementioned example, operation to be executed the allowable displacement is exceeded comprises stopping the master axis and slave axis and setting the OUT1 signal to ON, however, avoidance operation can also be specified. For example, in this case of operation to avoid a movable axis, a program instructing this avoidance operation is registered in the operation executed when the allowable displacement is exceeded. When the displacement detection means detects that the allowable displacement has been exceeded, synchronous relationship verification processing immediately executes the specified program. Thus, avoidance operation is executed.

Furthermore, if the synchronous relationship verification processing is started, it is normally executed until the termination conditions are satisfied. However, even if the termination condition is not satisfied, the specified synchronous relationship verification processing can be terminated by a halt command from another program. For example, if program 1 and program 2 are executed in parallel, synchronous relationship verification processing is assumed to be started in a block within program 1. When one of the termination conditions for synchronous relationship verification processing is termination of a block of the program 2 operating in parallel, means of notifying the termination conditions of termination of the block of the program 2 are required. For example, a specific signal is set to '1' as this means, and the fact that the specific signal is '1' can be set in information to be set as the termination condition. Furthermore, if specified synchronous relationship verification processing can be halted immediately after a block in program 2 that terminates synchronous relationship verification processing, there is no longer a need to use the aforementioned notification means.

For example, a synchronous relationship verification processing halt instruction is provided, and when this instruction is loaded, synchronous relationship verification processing is halted. FIG. 13 is an example of the format of a command for such a halt instruction. 'G65 H501' is the instruction to halt synchronous relationship verification processing, and 'P1' is the synchronous relationship information 1 to be halted. When the halt of synchronous relationship verification processing is accepted, the corresponding synchronous relationship verification processing is terminated.

What is claimed is:

1. A synchronous control device synchronously controlling at least two movable axes, having one movable axis as a reference, and at least one other movable axis as a synchronized axis, comprising:
    position detector to constantly determine the position of each movable axis;
    storage to store information on the synchronous relationship between the positions of the movable axes subject to synchronous control, an allowable displacement, and an operation to be executed when the allowable displacement is exceeded;
    displacement detector to detect whether or not the relationship between the positions of the respective movable axes determined by said position detector is within the range of said allowable displacement; and
    abnormal time operation unit to execute said operation to be executed when the allowable displacement is exceeded, when said displacement detector detects that the relationship between the positions of the respective movable axes exceeds said allowable displacement.

2. The synchronous control device according to claim 1, wherein said storage store at least one set of information on the synchronous relationship between the positions of the movable axes subject to synchronous control, and the allowable displacement,
    said synchronous control device further comprises a selector to select one set of information of the sets of information stored in the storage, and
    said displacement detector detects whether or not the relationship of the positions of the movable axes is within the range of the allowable displacement in the selected set of information.

3. The synchronous control device according to claim 1, wherein said synchronous control and verification of the synchronous relationship are executed in parallel.

4. The synchronous control device according to claim 3, wherein verification of the synchronous relationship executed in parallel with the synchronous control is executed by a signal input or program command.

5. A synchronous control device synchronously controlling at least two movable axes, having one movable axis as a reference, and at least one other movable axis as a synchronized axis, comprising:
    position detector to constantly determine the position of each movable axis;
    storage to store at least one set of information on the synchronous relationship between the positions of the movable axes subject to synchronous control, allowable displacement, a synchronous relationship verification start condition, a synchronous relationship verification termination condition, and an operation to be executed when the allowable displacement is exceeded;
    a selector to select one set of information from the information stored in said storage;
    synchronous relationship verification start determiner to determine whether or not the verification start condition for synchronous relationship of the information selected with said selector has been satisfied;
    displacement detector to detect whether or not the relationship between the positions of the respective movable axes determined by said position detector is within the range of said allowable displacement after verification of the synchronous relationship has started with said synchronous relationship verification start determiner;
    abnormal time operation unit to execute said operation to be executed when the allowable displacement is exceeded, when said displacement detector detects that the relationship between the positions of the respective movable axes exceeds said allowable displacement; and
    synchronous relationship verification termination unit to determine whether or not the termination condition for synchronous relationship verification is satisfied after verification of the synchronous relationship has started, and to terminate verification as to whether or not the synchronous relationship is in the normal status when the termination condition is satisfied.

6. The synchronous control device according to claim 5, wherein the synchronous control and verification of the synchronous relationship are executed in parallel.

7. The synchronous control device according to claim 6, wherein verification of the synchronous relationship executed in parallel with the synchronous control is executed by a signal input or program command.

8. The synchronous control device according to claim 5, wherein said synchronous relationship between the positions of the movable axes subject to synchronous control is composed of an interval and an equation of synchronous relationship between the movable axes in the interval.

9. The synchronous control device according to claim 8, wherein the number of the intervals set and stored is at least one.

10. The synchronous control device according to claim 5, wherein the synchronous relationship verification start condition and the synchronous relationship verification termination condition stored in the storage specify at least one of conditions including relative or absolute time, instructed position of at least one axis, and signal status.

11. The synchronous control device according to claim 5, further comprising speed detector to detect the speed of each movable axis, and the synchronous relationship verification start condition and the synchronous relationship verification termination condition stored in the storage specify the speed detected with the speed detector.

12. The synchronous control device according to claim 5, wherein any of actual movable axis position information, instructed position information, and time information, can be specified for the synchronous relationship between the positions of the movable axes stored in the storage.

13. The synchronous control device according to claim 5, wherein the synchronous relationship of the positions of the movable axes stored in the storage specifies a track by specifying the position information for each axis in the synchronous relationship with a sequence of points, and specifies an arbitrary expression between each sequence of points.

14. The synchronous control device according to claim 13, wherein the allowable displacement between each pair of points in the sequence of points is specified as distance information or an equation.

15. The synchronous control device according to claim 5, wherein operation with said abnormal time operator is conducted by a program command, and a control program set and stored is executed based on this command.

16. The synchronous control device according to claim 5, wherein verification of the synchronous relationship can be halted by a signal or program during the verification of the synchronous relationship.

* * * * *

UNITED STATES PATENT AND TRADEMARK OFFICE
CERTIFICATE OF CORRECTION

PATENT NO.         : 7,301,297 B2
APPLICATION NO.    : 11/110899
DATED              : November 27, 2007
INVENTOR(S)        : Kentaro Fujibayashi et al.

It is certified that error appears in the above-identified patent and that said Letters Patent is hereby corrected as shown below:

Column 2, Line 6, change "incorporates" to --incorporate--.

Signed and Sealed this

Sixth Day of May, 2008

JON W. DUDAS
*Director of the United States Patent and Trademark Office*